(12) United States Patent
Wang et al.

(10) Patent No.: US 12,412,592 B2
(45) Date of Patent: Sep. 9, 2025

(54) HYPER-PARAMETER OPTIMIZATION SYSTEM, METHOD, AND PROGRAM

(71) Applicant: NEC Corporation, Tokyo (JP)

(72) Inventors: Qiongqiong Wang, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 227 days.

(21) Appl. No.: 18/030,155

(22) PCT Filed: Oct. 15, 2020

(86) PCT No.: PCT/JP2020/038860
§ 371 (c)(1),
(2) Date: Apr. 4, 2023

(87) PCT Pub. No.: WO2022/079848
PCT Pub. Date: Apr. 21, 2022

(65) Prior Publication Data
US 2023/0368809 A1  Nov. 16, 2023

(51) Int. Cl.
*G10L 21/0264* (2013.01)
*G10L 15/06* (2013.01)
(Continued)

(52) U.S. Cl.
CPC ........ *G10L 21/0264* (2013.01); *G10L 15/063* (2013.01); *G10L 25/21* (2013.01); *G10L 25/30* (2013.01)

(58) Field of Classification Search
CPC ... G10L 21/0264; G10L 15/063; G10L 25/21; G10L 25/30
See application file for complete search history.

(56) References Cited

U.S. PATENT DOCUMENTS 11,443,169 B2 *  9/2022  Kurata ................. G06N 3/047
12,014,748 B1 *  6/2024  Giri ...................... G10L 21/034
(Continued)

FOREIGN PATENT DOCUMENTS

WO      2020/045313 A1    3/2020

OTHER PUBLICATIONS

Smithson, S. C., Yang, G., Gross, W. J., & Meyer, B. H. (Nov. 2016). Neural networks designing neural networks: multi-objective hyper-parameter optimization. In 2016 IEEE/ACM International Conference on Computer-Aided Design (ICCAD) (pp. 1-8). IEEE. (Year: 2016).*

(Continued)

*Primary Examiner* — Bhavesh M Mehta
*Assistant Examiner* — Philip H Lam

(57) ABSTRACT

A speech enhancement means 81 determines an enhancement mask generated based on a mask for speech enhancement, when a test utterance is input as speech data. A first hyper-parameter optimization means 82 determines, when the test utterance is input, a first hyper-parameter which is a hyper-parameter representing the degree to which the signal representing the test utterance is kept using the mask, and the first hyper-parameter which is set to take into account a downstream task that is processed using an enhanced test utterance. A mask generation means 83 generates an adaptive mask from the determined enhancement mask and the first hyper-parameter that enhances the test utterance for the downstream task. The mask generation means 83 generates the adaptive mask in which the first hyper-parameter is a power of the mask.

9 Claims, 10 Drawing Sheets

(51) Int. Cl.
G10L 25/21 (2013.01)
G10L 25/30 (2013.01)

(56) References Cited

U.S. PATENT DOCUMENTS

| | | | |
|---|---|---|---|
| 2018/0307969 A1* | 10/2018 | Shibahara | G06F 18/24317 |
| 2018/0336493 A1* | 11/2018 | Hayes | G06N 20/20 |
| 2019/0043516 A1* | 2/2019 | Germain | G10L 15/16 |
| 2019/0132687 A1* | 5/2019 | Santos | H04R 25/50 |
| 2019/0236487 A1* | 8/2019 | Huang | G06N 20/00 |
| 2020/0104678 A1* | 4/2020 | Nixon | G06N 3/042 |
| 2020/0226496 A1* | 7/2020 | Basu | G06N 5/01 |
| 2021/0216687 A1 | 7/2021 | Nakatani et al. | |
| 2023/0059708 A1* | 2/2023 | Metz | G06N 3/084 |

OTHER PUBLICATIONS

Togami, M. (May 2019). Simultaneous optimization of forgetting factor and time-frequency mask for block online multi-channel speech enhancement. In ICASSP 2019-2019 IEEE International Conference on Acoustics, Speech and Signal Processing (ICASSP ) (pp. 2702-2706). IEEE. (Year: 2019).*

Pertila, P. (2017). Microphone-Array-Based Speech Enhancement Using Neural Networks. Parametric Time-Frequency Domain Spatial Audio, 291-325. (Year: 2017).*

Wang, S., Li, W., Siniscalchi, S. M., & Lee, C. H. (May 2020). A cross-task transfer learning approach to adapting deep speech enhancement models to unseen background noise using paired senone classifiers. In ICASSP 2020-2020 IEEE International Conference on Acoustics, Speech and Signal Processing (Year: 2020).*

International Search Report for PCT Application No. PCT/JP2020/038860, mailed on Dec. 1, 2020.

English translation of Written opinion for PCT Application No. PCT/JP2020/038860, mailed on Dec. 1, 2020.

DeLiang Wang et al., "Supervised Speech Separation Based on Deep Learning: An Overview", IEEE/ACM Transactions on Audio, Speech, and Language Processing, vol. 26, No. 10, Oct. 2018, pp. 1702-1726.

Mirco Ravanelli et al., "A network of deep neural networks for Distant Speech Recognition", 2017 IEEE International Conference on Acoustics, Speech and Signal Processing (ICASSP), Jun. 19, 2017, pp. 4880-4884, <URL: https://ieeexplore.ieee.org/document/7953084>.

* cited by examiner

HYPER-PARAMETER OPTIMIZATION SYSTEM, METHOD, AND PROGRAM

This application is a National Stage Entry of PCT/JP2020/038860 filed on Oct. 15, 2020, the contents of all of which are incorporated herein by reference, in their entirety.

TECHNICAL FIELD

The disclosure relates to a hyper-parameter optimization system, hyper-parameter optimization method, and hyper-parameter optimization program for determining an optimal hyper-parameter of masks used for speech enhancement.

BACKGROUND ART

Neutral network-based speech enhancement methods have been more promising than general methods that manually turns multiple preprocessing steps. For example, Non-Patent Literature 1 discloses a deep learning based supervised speech separation method as a separation algorithm used when performing speech enhancement.

CITATION LIST

Non Patent Literature

[NPL 1]
D. L. Wang and J. Chen, "Supervised speech separation based on deep learning: An overview", IEEE/ACM, Trans. Audio Speech Lang. Process., 26, pp. 1702-1726, 2018

SUMMARY OF INVENTION

Technical Problem

On the other hand, the purpose of speech enhancement is to improve speech quality. Therefore, speech enhancement does not guarantee subsequent tasks (hereinafter, referred to as downstream tasks) using the enhanced speech, such as speech recognition and speaker recognition. In other words, optimal speech enhancement methods may be different for different downstream tasks. Then, the speech enhancement disclosed in Non-Patent Literature may degrade downstream tasks performance on clean or less noisy speech.

Therefore, it is conceivable to set a mask that enhances the speech according to the downstream task. However, it is difficult for the user to appropriately set hyper-parameters of the mask used for speech enhancement for each downstream task. Therefore, it is preferable that the optimum hyper-parameters of the mask for speech enhancement can be determined according to the nature of the downstream task.

It is an exemplary object of the disclosure to provide a hyper-parameter optimization system, hyper-parameter optimizer method, and hyper-parameter optimization program that can determine the optimum hyper-parameters of the mask that enhances speech according to the nature of the downstream task.

Solution to Problem

A hyper-parameter optimization system including: a speech enhancement means which determines an enhancement mask generated based on a mask for speech enhancement, when a test utterance is input as speech data; a first hyper-parameter optimization means which determines, when the test utterance is input, a first hyper-parameter which is a hyper-parameter representing the degree to which the signal representing the test utterance is kept using the mask, and the first hyper-parameter which is set to take into account a downstream task that is processed using an enhanced test utterance; and a mask generation means which generates an adaptive mask from the determined enhancement mask and the first hyper-parameter that enhances the test utterance for the downstream task, wherein the mask generation means generates the adaptive mask in which the first hyper-parameter is a power of the mask.

A hyper-parameter optimization method including: determining an enhancement mask generated based on a mask for speech enhancement, when a test utterance is input as speech data;
determining, when the test utterance is input, a first hyper-parameter which is a hyper-parameter representing the degree to which the signal representing the test utterance is kept using the mask, and the first hyper-parameter which is set to take into account a downstream task that is processed using an enhanced test utterance; and generating an adaptive mask from the determined enhancement mask and the first hyper-parameter that enhances the test utterance for the downstream task, wherein the adaptive mask in which the first hyper-parameter is a power of the mask is generated.

A hyper-parameter optimization program for causing a computer to execute: a speech enhancement process of determining an enhancement mask generated based on a mask for speech enhancement, when a test utterance is input as speech data; a first hyper-parameter optimization process of determining, when the test utterance is input, a first hyper-parameter which is a hyper-parameter representing the degree to which the signal representing the test utterance is kept using the mask, and the first hyper-parameter which is set to take into account a downstream task that is processed using an enhanced test utterance; and a mask generation process of generating an adaptive mask from the determined enhancement mask and the first hyper-parameter that enhances the test utterance for the downstream task, wherein the adaptive mask in which the first hyper-parameter is a power of the mask is generated.

It depicts a flowchart illustrating the process of the third exemplary embodiment of the hyper-parameter optimization system 300.

FIG. 7

It depicts an exemplary block diagram illustrating the structure of a fourth exemplary embodiment of a hyper-parameter optimization system according to the disclosure.

FIG. 8

It depicts a flowchart illustrating the process of the fourth exemplary embodiment of the hyper-parameter optimization system 400.

FIG. 9

It depicts a block diagram illustrating an outline of the hyper-parameter optimization system according to the disclosure.

FIG. 10

It depicts a schematic block diagram illustrating a configuration of a computer according to at least one of the exemplary embodiments.

DESCRIPTION OF EMBODIMENTS

The following describes an exemplary embodiment of the disclosure with reference to drawings.

Note that in the following explanation, when using a Greek letter in the text, an English notation of Greek letter may be enclosed in brackets ([ ]). Furthermore, the unidirectional arrows shown in each block diagram are a straightforward indication of the direction of information flow and do not exclude bidirectionality.

First Exemplary Embodiment

Figure 1:
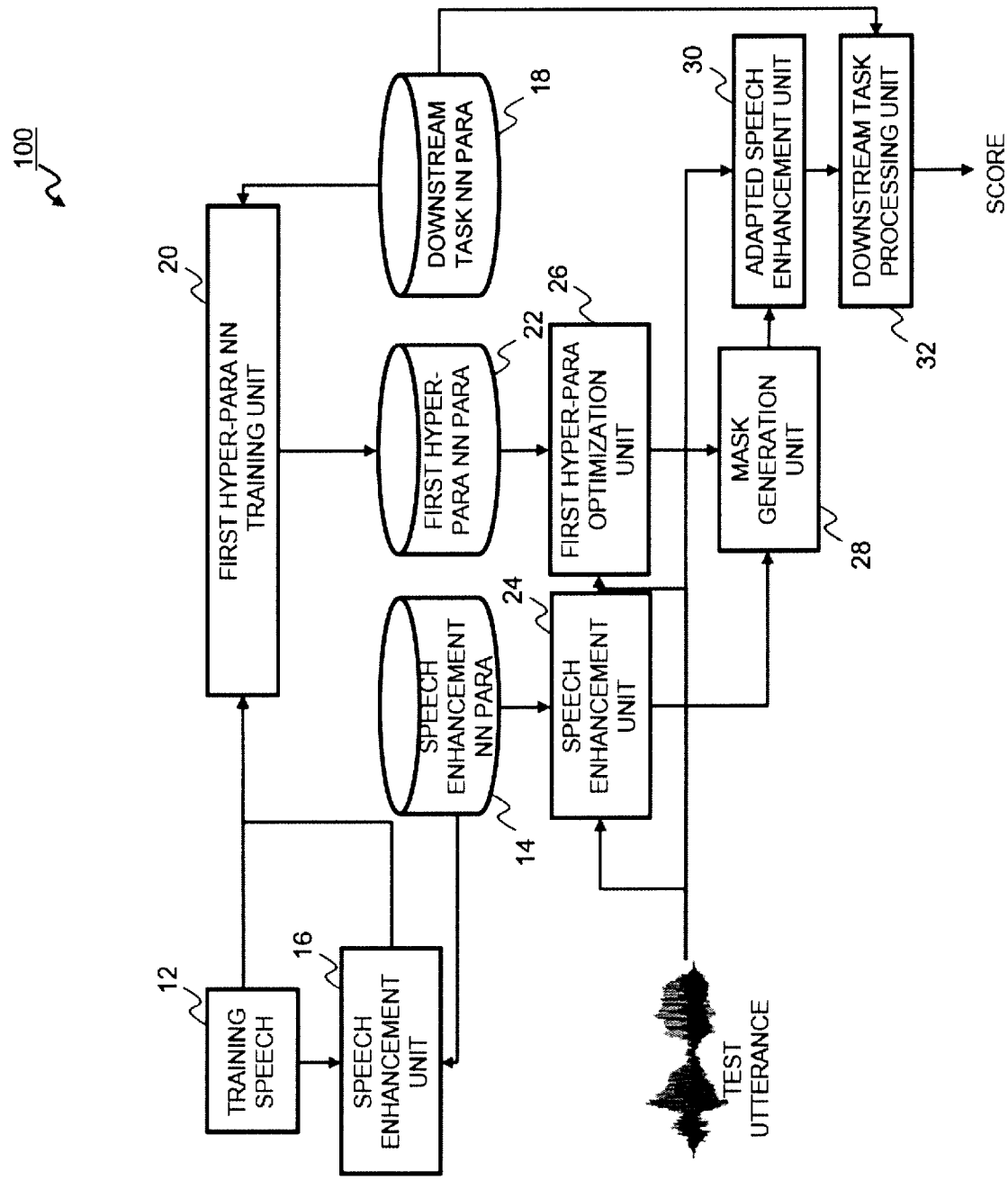
FIG. 1
It depicts an exemplary block diagram illustrating the structure of a first exemplary embodiment of a hyper-parameter optimization system according to the disclosure.

FIG. 1 depicts an exemplary block diagram illustrating the structure of a first exemplary embodiment of a hyper-parameter optimization system according to the disclosure. The hyper-parameter optimization system 100 according to the first exemplary embodiment includes a training speech input unit 12, a speech enhancement neural network (hereinafter, it is referred to as speech enhancement NN) parameter storage unit 14, a first speech enhancement unit 16, a downstream task neural network (hereinafter, it is referred to as downstream task NN) parameter storage unit 18, a first hyper-parameter neural network (hereinafter, it is referred to as first hyper-parameter NN) training unit 20, a first hyper-parameter NN parameter storage unit 22, a second speech enhancement unit 24, a first hyper-parameter optimization unit 26, a mask generation unit 28, an adapted speech enhancement unit 30, and a downstream task processing unit 32.

The training speech input unit 12 accepts speech data for training (hereinafter, it is referred to as training speech) by the first hyper-parameter NN training unit 20, which will be described below. Specifically, the training speech input unit 12 accepts as a training speech an input of a speech with noise (hereinafter, it is referred to as noisy speech). In this exemplary embodiment, the training speech includes a label indicating a processing result that is assumed to be performed by the downstream task processing unit 32 for the noisy speech (hereinafter, it may be referred to as the downstream task label), as described below.

The noisy speech is created in accordance with the environment (e.g., a situation in which noise is included, a language, a domain, etc.) in which the speech data for the target speech enhancement is acquired. The downstream task label is determined in accordance with the content of the processing performed by the downstream task processing unit 32. For example, when the downstream task processing unit 32 performs speaker recognition, the downstream task label is a speaker ID or the like.

The training speech input unit 12 may accept training speech input from an external storage server (not shown) and may retrieve the training speech from a storage unit (not shown) provided by the hyper-parameter optimization system 100.

The speech enhancement NN parameter storage unit 14 stores trained parameters of a neural network that generates an enhancement mask (hereinafter it may be referred to simply as mask), which is generated based on a mask for speech enhancement, from the speech data. The speech enhancement neural network is also referred to as the speech enhancement NN. The enhancement mask is defined, for example, as a power of the hyper-parameter of the mask and is used to enhance the desired speech.

The speech enhancement NN is a trained model for causing a computer to output an enhancement mask from speech data (a speech signal) with noise. Specifically, the speech enhancement NN is a trained neural network that has been machine trained using the training data to calculate an optimal mask (i.e., an enhancement mask) to be used to enhance the desired speech contained in the speech data when speech data with noise is inputted.

The type of the mask used in this exemplary embodiment is not particularly limited. The mask is, for example, a matrix consisting of real or complex continuous values taking at least one form of Ideal Ratio Mask, Complex Ideal Ratio Mask, Spectral Magnitude Mask, and Phase-Sensitive Mask.

In the first exemplary embodiment, it is assumed that the speech enhancement NN is learned beforehand by another learning device (not shown) or the like, and the parameters of the learned speech enhancement NN are stored in the speech enhancement NN parameter storage unit 14.

The first speech enhancement unit 16 determines a mask (i.e., the enhancement mask) to be used for speech enhancement from the accepted training speech using the speech enhancement NN parameter stored in the speech enhancement NN parameter storage unit 14. Specifically, the first speech enhancement unit 16 applies the training speech to the input layer of the neural network indicated by the speech enhancement NN parameter, and outputs the enhancement mask from the output layer. Since the first speech enhancement unit 16 obtains the speech enhancement NN parameter stored in the speech enhancement NN parameter storage unit 14, the first speech enhancement unit 16 can also be said to have a speech enhancement NN.

The downstream task NN parameter storage unit 18 stores parameters of the neural network used by the downstream task processing unit 32 (Hereinafter referred to as the downstream task NN.), which will be described below. In this exemplary embodiment, the downstream task NN parameter storage unit 18 is assumed to store the parameters of the downstream task NN that have already been learned.

The first hyper-parameter NN learning unit 20 learns a neural network (first hyper-parameter NN) in which the first hyper-parameter optimization unit 26, which will be described below, estimates a hyper-parameter [gamma] (hereinafter referred to as the first hyper-parameter) corresponding to a power of a mask (hereinafter referred to as the adaptive mask) that performs an enhancement adapted to the processing of the downstream tasks on speech data. The hyper-parameter [gamma] is a non-negative scalar value.

This first hyper-parameter is a hyper-parameter that is set to take into account the downstream task and represents the degree to which the signal representing the speech data used for testing with the mask is kept, with smaller values indicating more signal being kept.

The first hyper-parameter NN is a trained neural network that has been machine trained with training data including training speech (including downstream task labels), the mask (enhancement mask), and parameters of the downstream task NN so as to calculate the optimal first hyper-parameter when noisy speech data is input.

Specifically, the first hyper-parameter NN learning unit 20 learns a weighting factor of the neural network for a neural network including an input layer that accepts inputs of speech data and an output layer that outputs the first hyper-parameter to minimize a loss function indicating an error between the downstream task label and a processing result of the downstream task processing unit 32 (downstream task NN), which will be described below, using the training data including training speech (including downstream task labels) with noise, the mask and parameters of the downstream task NN.

The content of the loss function depends on the manner of the downstream task. For example, it is assumed that the downstream task is speaker recognition and the downstream task processing unit 32 outputs the posterior of the estimated speaker ID as a processing result. In this case, the first hyper-parameter NN learning unit 20 may learn a weighting factor of the neural network to minimize the cross-entropy error between the ground truth speaker ID indicated by the downstream task label and the estimated output speaker ID posterior of the estimated speaker ID.

The first hyper-parameter NN parameter storage unit 22 stores the parameters of the first hyper-parameter NN learned by the first hyper-parameter NN learning unit 20.

The second speech enhancement unit 24 determines the enhancement mask from the test utterance, when the test utterance is inputted, using the speech enhancement NN parameters stored in the speech enhancement NN parameter storage unit 14. The method of determining the mask is the same as the method performed by the first speech enhancement unit 16. Since the second speech enhancement unit 24 obtains the speech enhancement NN parameter stored in the speech enhancement NN parameter storage unit 14, the second speech enhancement unit 24 can also be said to have a speech enhancement NN.

The first hyper-parameter optimization unit 26 applies, when the test utterance is inputted, the inputted test utterance to the first hyper-parameter NN to calculate the optimized hyper-parameter [gamma] (i.e., the first hyper-parameter).

The mask generation unit 28 generates a mask (i.e., an adaptive mask) $M^{[gamma]}$ from the enhancement mask determined by the second speech enhancement unit 24 and the first hyper-parameter [gamma] optimized by the first hyper-parameter optimization unit 26 to enhance the test utterances adapted to the downstream task. Specifically, the mask generation unit 28 generates an adaptive mask with the first hyper-parameter [gamma] as a power of the mask. The adaptive mask $M^{[gamma]}$ is also a time-frequency matrix of real values.

The adapted speech enhancement unit 30 applies the adaptive mask $M^{[gamma]}$ to the test utterances to generate the enhanced speech data (hereinafter referred to as the adaptive speech data). Note that the enhanced speech data Y' is represented by Equation 1 shown below, where Y is the test utterance.

$$Y'=Y*M \qquad \text{(Equation 1)}$$

The downstream task processing unit 32 inputs the adaptive speech data generated by the adapted speech enhancement unit 30 into the downstream task NN and outputs the processing result. The manner of the downstream task NN is determined according to the processing content. For example, if the content of the downstream task is speaker recognition, the downstream task processing unit 32 may output a posterior of the speaker ID as a processing result, as described above.

The first hyper-parameter NN learning unit 20 calculates an error using a loss function based on the output processing result, and propagates the calculated error to the first hyper-parameter NN.

The training speech input unit 12, the first speech enhancement unit 16, the first hyper-parameter NN training unit 20, the second speech enhancement unit 24, the first hyper-parameter optimization unit 26, the mask generation unit 28, the adapted speech enhancement unit 30, and a downstream task processing unit 32 are implemented by a CPU of a computer operating according to a program (hyper-parameter optimization program). For example, the program may be stored in a storage medium (not shown) provided by the parameter optimization system 100, with the CPU reading the program and, according to the program, operating as the training speech input unit 12, the first speech enhancement unit 16, the first hyper-parameter NN training unit 20, the second speech enhancement unit 24, the first hyper-parameter optimization unit 26, the mask generation unit 28, the adapted speech enhancement unit 30, and a downstream task processing unit 32. The functions of the parameter optimization system 100 may be provided in the form of SaaS (Software as a Service).

The training speech input unit 12, the first speech enhancement unit 16, the first hyper-parameter NN training unit 20, the second speech enhancement unit 24, the first hyper-parameter optimization unit 26, the mask generation unit 28, the adapted speech enhancement unit 30, and a downstream task processing unit 32 may each be implemented by dedicated hardware. All or part of the components of each device may be implemented by general-purpose or dedicated circuitry, processors, or combinations thereof. They may be configured with a single chip, or configured with a plurality of chips connected via a bus. All or part of the components of each device may be implemented by a combination of the above-mentioned circuitry or the like and program.

In the case where all or part of the components of each device is implemented by a plurality of information processing devices, circuitry, or the like, the plurality of information processing devices, circuitry, or the like may be centralized or distributed. For example, the information processing devices, circuitry, or the like may be implemented in a form in which they are connected via a communication network, such as a client-and-server system or a cloud computing system.

The speech enhancement NN parameter storage unit 14, the downstream task NN parameter storage unit 18, and the first hyper-parameter NN parameter storage unit 22 are realized, for example, by a magnetic disk or the like.

Figure 2:
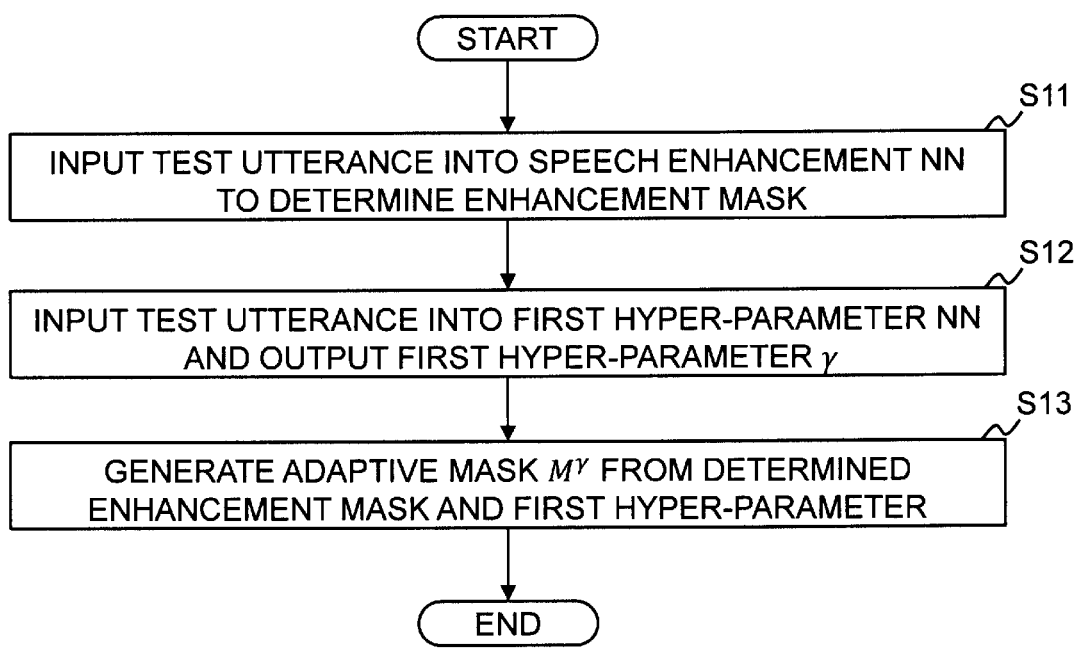
FIG. 2
It depicts a flowchart illustrating the process of the first exemplary embodiment of the hyper-parameter optimization system 100.

Next, an operation example of the parameter optimization system according to the present exemplary embodiment will be described. FIG. 2 depicts a flowchart illustrating the process of the first exemplary embodiment of the parameter optimization system 100 according to the disclosure.

The second speech enhancement unit 24 inputs the test utterance into the speech enhancement NN to determine the enhancement mask (step S11). The first hyper-parameter optimization unit 26 inputs the test utterance into the first hyper-parameter NN and outputs the first hyper-parameter [gamma] (step S12). Then, the mask generation unit 28 generates the adaptive mask $M^{[gamma]}$ from the determined enhancement mask and the first hyper-parameter (step S13).

Thereafter, the adapted speech enhancement unit 30 generates adaptive speech data from the test utterances using the adaptive mask $M^{[gamma]}$, and the downstream task processing unit 32 inputs the generated adaptive speech data into the downstream task NN and outputs the processing result.

In this exemplary embodiment, the first hyper-parameter NN training unit 20 learns the first hyper-parameter NN by a machine learning using data including the training speech, the enhancement mask, and the parameters of the neural network of the downstream task as training data.

As described above, in the present exemplary embodiment, when the test utterance is input, the second speech enhancement unit 24 determines the enhancement mask generated based on the mask for speech enhancement from the test utterance, and the first hyper-parameter optimization unit 26 determines the first hyper-parameter [gamma] when the test utterance is input. Then, the mask generation unit 28 generates the adaptive mask $M^{[gamma]}$ in which the first hyper-parameter is a power of the mask. Thus, an optimal hyper-parameter indicating the power of the mask for speech enhancement can be determined according to the nature of the downstream task.

In other words, in this exemplary embodiment, an adaptive mask is generated from the first hyper-parameter NN learned by the first hyper-parameter NN learning unit 20 to enhance the test utterance adapted to the downstream task. As a result, the speech can be enhanced taking into account the trade-off between speech clarity and processing accuracy for the downstream tasks speech.

Second Exemplary Embodiment

Next, a second exemplary embodiment of the hyper-parameter optimization system of the disclosure will be described. In the first exemplary embodiment, the configuration in which the parameters of the downstream task NN are learned beforehand and stored in the downstream task NN parameter storage unit 18 is described as an example. The second exemplary embodiment describes an example configuration in which the first hyper-parameter NN and the downstream task NN are learned together.

Figure 3:
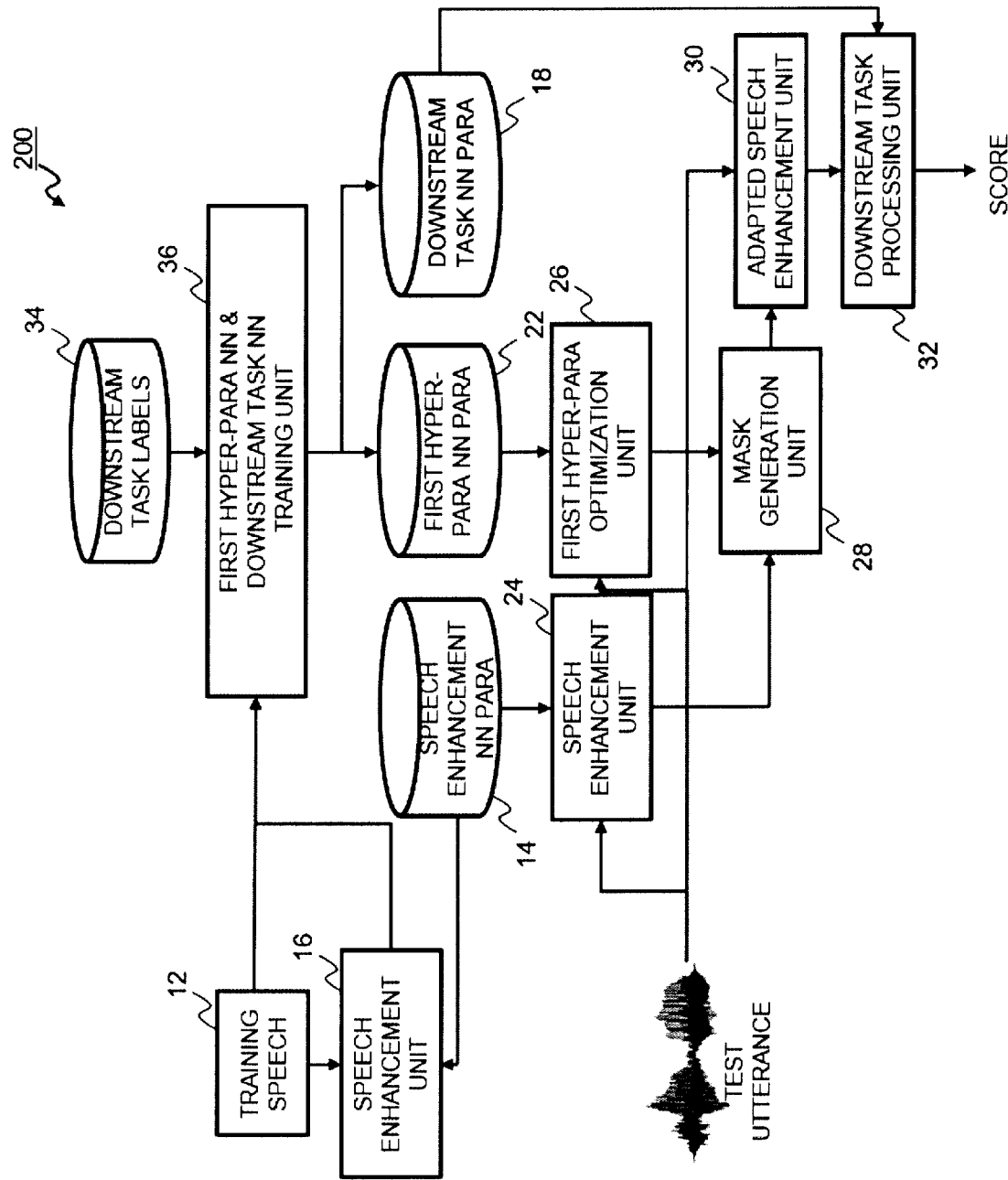
FIG. 3
It depicts an exemplary block diagram illustrating the structure of a second exemplary embodiment of a hyper-parameter optimization system according to the disclosure.

FIG. 3 depicts an exemplary block diagram illustrating the structure of a second exemplary embodiment of a hyper-parameter optimization system according to the disclosure. The hyper-parameter optimization system 200 according to the second exemplary embodiment includes the training speech input unit 12, the speech enhancement NN parameter storage unit 14, the first speech enhancement unit 16, a downstream task label storage unit 34, a first hyper-parameter NN and downstream task NN training unit 36, the downstream task NN parameter storage unit 18, the first hyper-parameter NN parameter storage unit 22, the second speech enhancement unit 24, the first hyper-parameter optimization unit 26, the mask generation unit 28, the adapted speech enhancement unit 30, and a downstream task processing unit 32.

That is, the hyper-parameter optimization system 200 of this exemplary embodiment differs from the hyper-parameter optimization system 100 of the first exemplary embodiment in that it further provides a downstream task label storage unit 34 and has a first hyper-parameter NN and downstream task NN learning unit 36 instead of the first hyper-parameter NN learning unit 20. Otherwise, the configuration is the same as in the first exemplary embodiment.

The downstream task label storage unit 34 stores the task training data used by the first hyper-parameter NN and downstream task NN learning unit 36 for learning the downstream task NN, which will be described below. The task training data is data associated with the speech data and a correct label for the downstream task (i.e., downstream task label), and is defined according to the content of the downstream task. For example, if the downstream task is speaker recognition, the downstream task label storage unit 34 may store the data corresponding to the noiseless speech (Hereinafter referred to as clean speech) and the speaker ID as task training data. Further, for example, if the downstream task is speech recognition, the downstream task label storage unit 34 may store data corresponding to the clean speech and text contents as the task training data.

The first hyper-parameter NN and downstream task NN learning unit 36 learns the first hyper-parameter NN and the downstream task NN. Specifically, the first hyper-parameter NN and downstream task NN learning unit 36 learns the weighting factors of the first hyper-parameter NN including an input layer that accepts inputs of speech data and an output layer that outputs the first hyper-parameter, and the downstream task NN including an input layer that accepts inputs of speech data and an output layer that outputs a result of processing by the downstream task so as to minimize a loss function indicating an error between the downstream task label and the processing result of the downstream task processing unit 32, using the training speech, the mask and the task training data as training data for the first hyper-parameter NN and the downstream task NN.

The training speech input unit 12, the first speech enhancement unit 16, the first hyper-parameter NN and downstream task NN learning unit 36, the second speech enhancement unit 24, the first hyper-parameter optimization unit 26, the mask generation unit 28, the adapted speech enhancement unit 30, and a downstream task processing unit 32 are implemented by a CPU of a computer operating according to a program (hyper-parameter optimization program).

Figure 4:
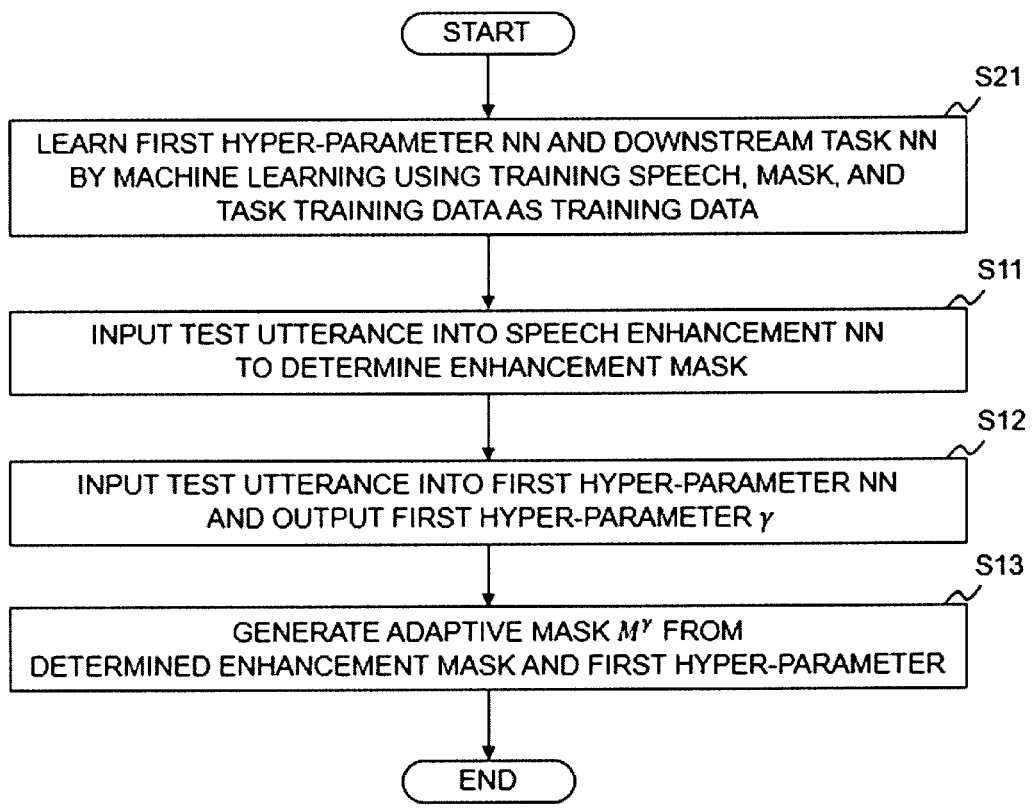
FIG. 4
It depicts a flowchart illustrating the process of the second exemplary embodiment of the hyper-parameter optimization system 200.

Next, an operation example of the parameter optimization system according to the present exemplary embodiment will be described. FIG. 4 depicts a flowchart illustrating the process of the second exemplary embodiment of the parameter optimization system 200 according to the disclosure.

The first hyper-parameter NN and downstream task NN learning unit 36 learns the first hyper-parameter NN and the downstream task NN by a machine learning using the training speech, the mask, and the task training data as training data (step S21). Thereafter, the processes of steps S11 to S13 in FIG. 2 are performed using the learned first hyper-parameter NN and the downstream task NN.

As described above, in the present exemplary embodiment, the first hyper-parameter NN and the downstream task NN learning unit 36 learns the first hyper-parameter NN and the downstream task NN. Therefore, in addition to the effect of the first exemplary embodiment, the downstream task NN can be optimized at the same time.

Third Exemplary Embodiment

Next, a third exemplary embodiment of the hyper-parameter optimization system of the disclosure will be described.

In the first exemplary embodiment and the second exemplary embodiment, the configuration in which the parameters of the speech enhancement NN are learned beforehand and stored in the speech enhancement NN parameter storage unit 14 is described as an example. The third exemplary embodiment describes an example configuration in which the first hyper-parameter NN and the speech enhancement NN are learned together.

Figure 5:
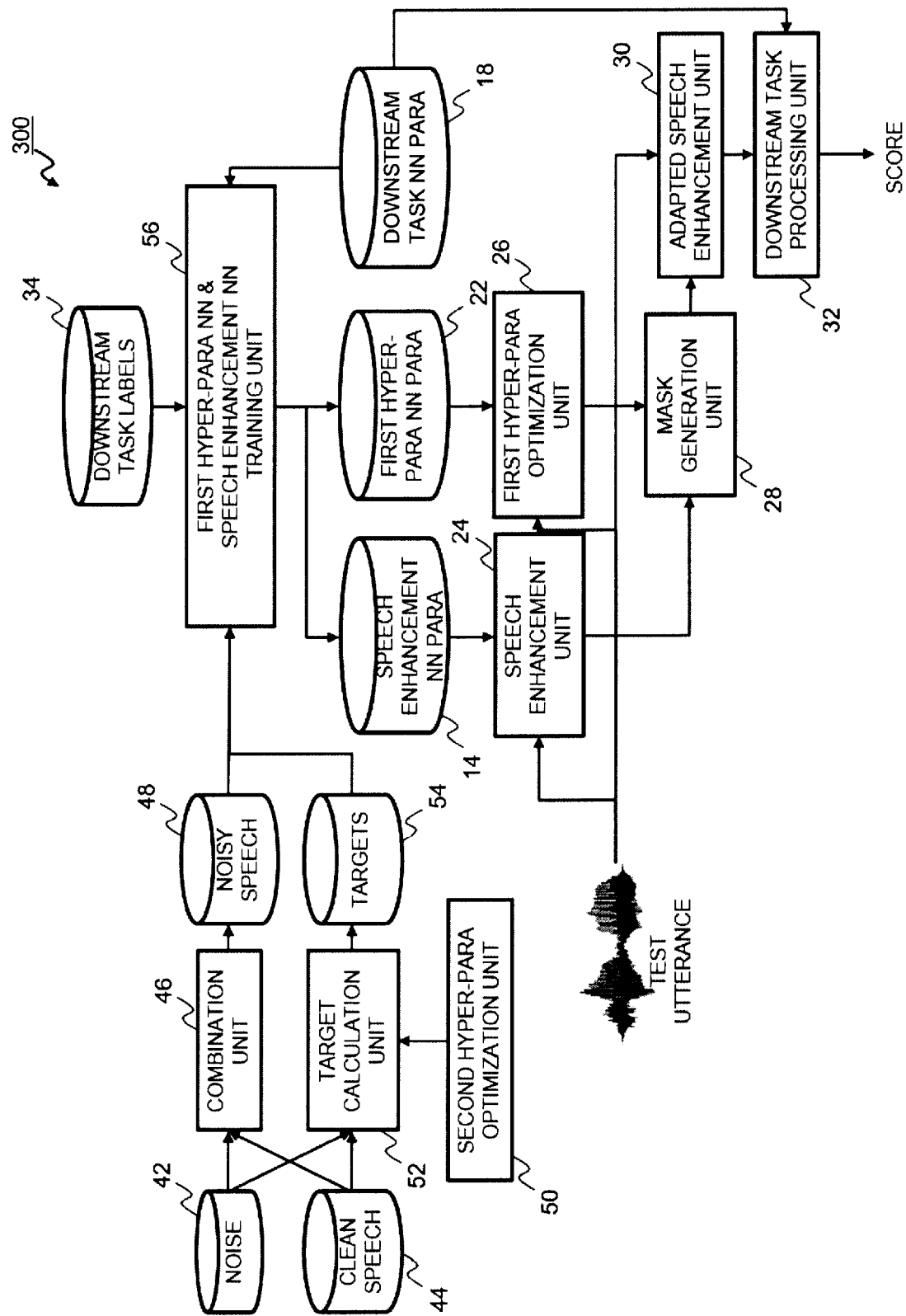
FIG. 5
It depicts an exemplary block diagram illustrating the structure of a third exemplary embodiment of a hyper-parameter optimization system according to the disclosure.

FIG. 5 depicts an exemplary block diagram illustrating the structure of a third exemplary embodiment of a hyper-parameter optimization system according to the disclosure. The hyper-parameter optimization system 300 according to the third exemplary embodiment includes a noise storage unit 42, a clean speech storage unit 44, a combination unit 46, a noisy speech storage unit 48, a second hyper-parameter optimization unit 50, a target calculation unit 52, a target storage unit 54, and a first hyper-parameter NN and speech enhancement NN learning unit 56.

Furthermore, the hyper-parameter optimization system 300 of the third exemplary embodiment includes the speech enhancement NN parameter storage unit 14, a downstream task label storage unit 34, the downstream task NN parameter storage unit 18, the first hyper-parameter NN parameter storage unit 22, the second speech enhancement unit 24, the first hyper-parameter optimization unit 26, the mask generation unit 28, the adapted speech enhancement unit 30, and a downstream task processing unit 32 as a similar configuration to the hyper-parameter optimization system 200 of the second embodiment.

The noise storage unit 42 stores one or more types of noise signals assumed for the test utterances. The clean speech storage unit 44 stores a noiseless speech (clean speech) that may be acquired under the same conditions (similar domain) and so on as the test utterance. The noise signal and the clean speech are prepared in advance by the user or others and stored in the noise storage unit 42 and the clean speech storage unit 44, respectively.

The combination unit 46 combines the noise signal and the clean speech to generate a speech with noise (hereinafter sometimes referred to as noisy speech). The generated noisy speech is represented, for example, by the following equation. The x here is used to determine the SNR (Speech-noise ratio:speech-noise ratio) of the generated noisy speech. Since the method of generating the noisy speech is widely known, a detailed explanation is omitted here.

Noisy speech=(noise signal*x+clean speech)

The combination unit 46 stores the generated noisy speech in the noisy speech storage unit 48.

The noisy speech storage unit 48 stores the noisy speech. The noisy speech storage unit 48 may store the noisy speech generated by the combination unit 46 and may store multi-SNR training data.

The second hyper-parameter optimization unit 50 determines a hyper-parameter [alpha] which indicates the degree to which the speech enhancement NN keeps the speech (in other words, the degree to which the noise is removed). In the following description, this hyper-parameter [alpha] will be referred to as the second hyper-parameter.

More specifically, the second hyper-parameter [alpha] is a hyper-parameter that controls in training how much weight the speech enhancement NN sets to keep the speech and how much weight the speech enhancement NN sets to denoise in speech enhancement using the mask. The second hyper-parameter [alpha] is a positive scalar value.

In this exemplary embodiment, the second hyper-parameter is a predetermined hyper-parameter that is manually tuned by the user or others. The second hyper-parameter optimization unit 50 determines that this hyper-parameter is used as the second hyper-parameter [alpha]. The second hyper-parameter may be, for example, a value optimized based on gradient methods.

The target calculation unit 52 calculates $M^{[alpha]}$ from the mask and the second hyper-parameter [alpha] predetermined for speech enhancement by a power of the second hyper-parameter [alpha] of the mask. $M^{[alpha]}$ may be a matrix indicating the degree of speech enhancement calculated based on the mask, and this $M^{[alpha]}$ may be referred to as "target". $M^{[alpha]}$ is a time-frequency matrix of real values, as well as the mask M and $M^{[gamma]}$.

The target storage unit 54 stores the target $M^{[alpha]}$ calculated by the target calculation unit 52.

The first hyper-parameter NN and speech enhancement NN learning unit 56 learns the first hyper-parameter NN and the speech enhancement NN. Specifically, using the data including noisy speech, the target, task training data, and parameters of the downstream task NN as training data, the first hyper-parameter NN and speech enhancement NN learning unit 56 learns the weighting factors of the first hyper-parameter NN (including an input layer that accepts inputs of speech data and an output layer that outputs the first hyper-parameter) and the weighting factors of the speech enhancement NN (including an input layer that accepts inputs of speech data and an output layer that outputs the target) so as to minimize the weighted sum of a first loss indicating the error between the downstream task label and the processing result of the downstream task and a second loss indicating the error between the target included in the training data and the target output by the speech enhancement NN.

The combination unit 46, the second hyper-parameter optimization unit 50, the target calculation unit 52, the first hyper-parameter NN and speech enhancement NN learning unit 56, the second speech enhancement unit 24, the first hyper-parameter optimization unit 26, the mask generation unit 28, the adapted speech enhancement unit 30, and a downstream task processing unit 32 are implemented by a CPU of a computer operating according to a program (hyper-parameter optimization program).

Figure 6:
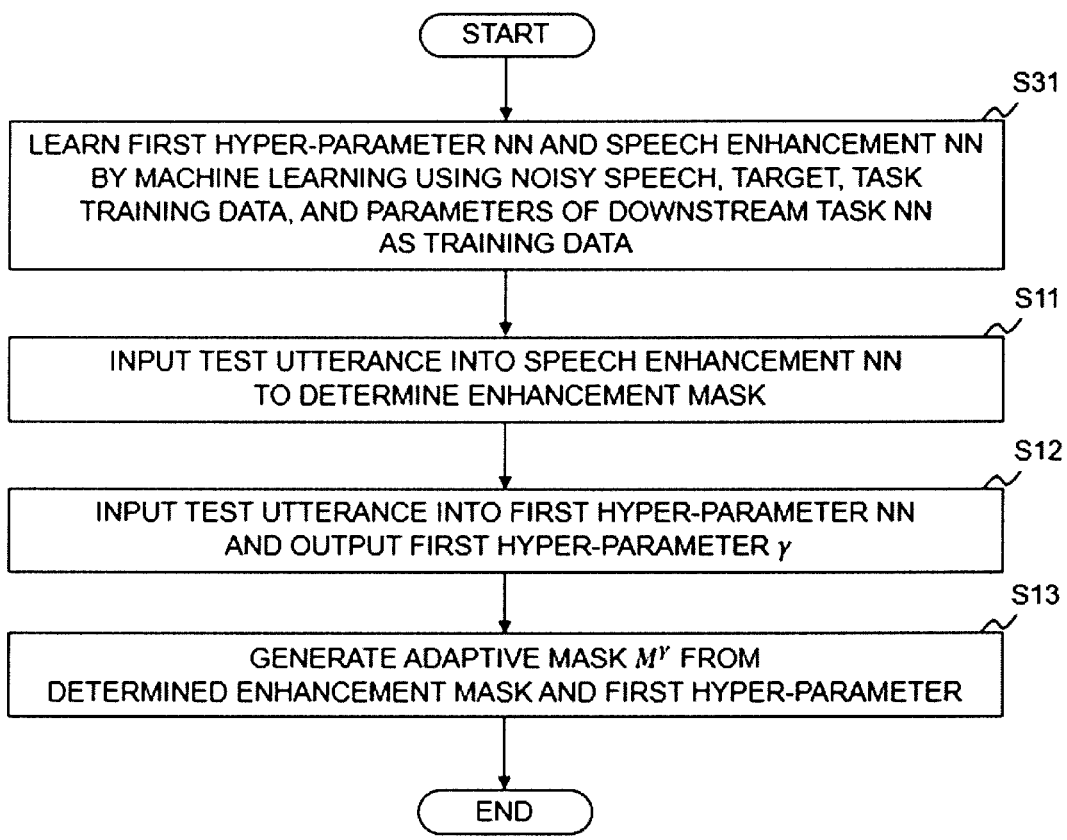
FIG. 6

Next, an operation example of the parameter optimization system according to the present exemplary embodiment will be described. FIG. 6 depicts a flowchart illustrating the process of the third exemplary embodiment of the parameter optimization system 300 according to the disclosure.

The first hyper-parameter NN and speech enhancement NN learning unit 56 learns the first hyper-parameter NN and the speech enhancement NN by a machine learning using the noisy speech generated by the combination unit 46, the target calculated by the target calculation unit 52, the task training data, and the parameters of the downstream task NN as training data (step S31). Thereafter, the processes of steps S11 to S13 in FIG. 2 are performed using the learned first hyper-parameter NN and the speech enhancement NN.

As described above, in the present exemplary embodiment, the first hyper-parameter NN and speech enhancement NN learning unit 56 learns the first hyper-parameter NN and the speech enhancement NN. Therefore, in addition to the effect of the first exemplary embodiment, the speech enhancement NN can be optimized at the same time.

Fourth Exemplary Embodiment

Next, a fourth exemplary embodiment of the hyper-parameter optimization system of the disclosure will be described. The fourth exemplary embodiment describes an example of a configuration in which the first hyper-parameter NN, the speech enhancement NN, and the downstream task NN are learned together.

Figure 7:
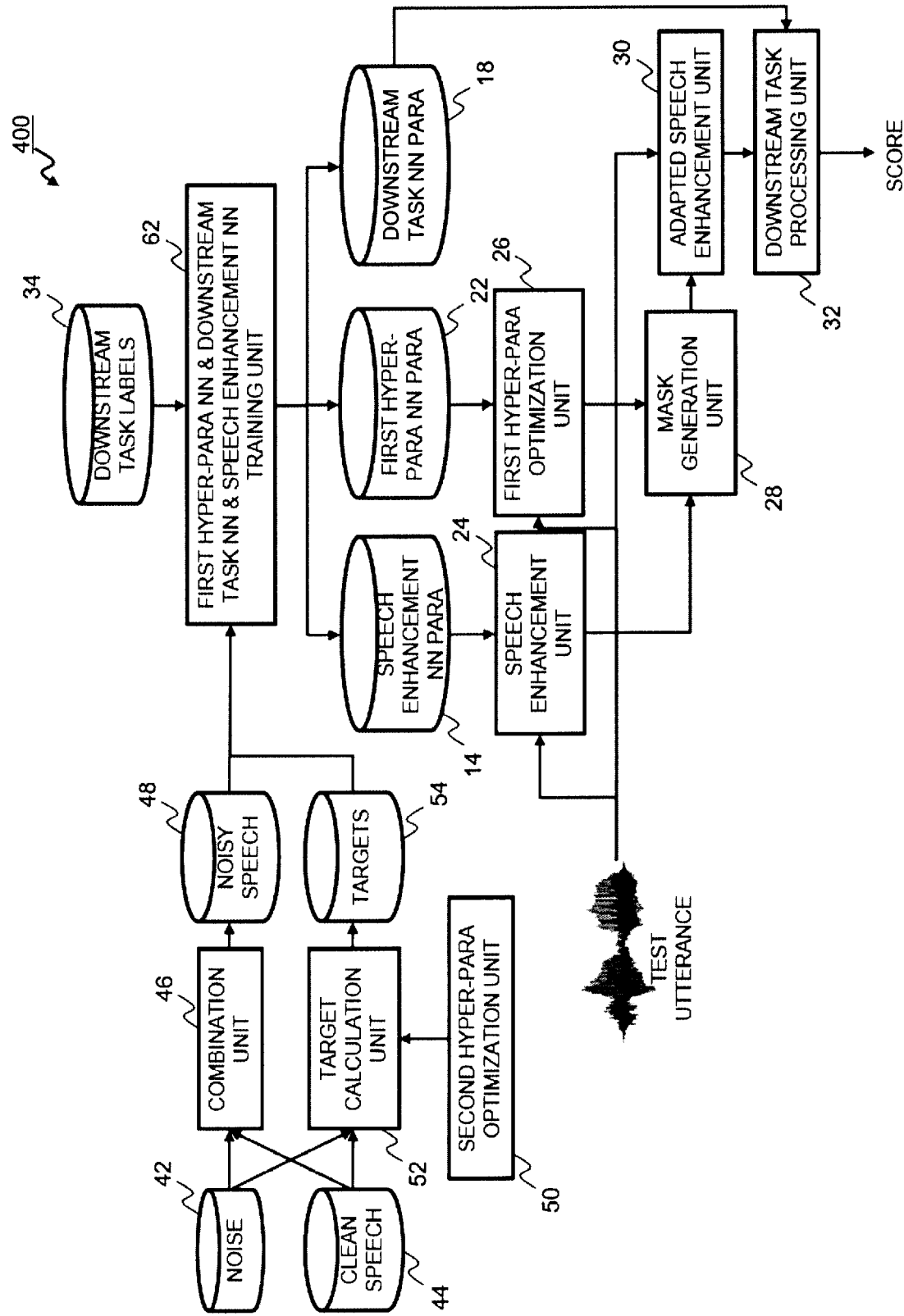

FIG. 7 depicts an exemplary block diagram illustrating the structure of a fourth exemplary embodiment of a hyper-parameter optimization system according to the disclosure. Compared with the configuration of the hyper-parameter optimization system 300 of the third embodiment, the hyper-parameter optimization system 400 of this exemplary embodiment includes a first hyper-parameter NN and downstream task NN and speech enhancement NN learning unit 62 instead of a first hyper-parameter NN and speech enhancement NN learning unit 56. Otherwise, the configuration is the same as in the third exemplary embodiment.

The first hyper-parameter NN and downstream task NN and speech enhancement NN learning unit 62 learns the first hyper-parameter NN, downstream task NN, and the speech enhancement NN. Specifically, using the data including noisy speech, the target, and task training data as training data, the first hyper-parameter NN and downstream task NN and speech enhancement NN learning unit 62 learns the weighting factors of the first hyper-parameter NN (including an input layer that accepts inputs of speech data and an output layer that outputs the first hyper-parameter), the weighting factors of the downstream task NN (including an input layer that accepts inputs of speech data and an output layer that outputs the processing result of the downstream task), and the weighting factors of the speech enhancement NN (including an input layer that accepts inputs of speech data and an output layer that outputs the target) so as to minimize the weighted sum of a first loss indicating the error between the downstream task label and the processing result of the downstream task and a second loss indicating the error between the target included in the training data and the target output by the speech enhancement NN.

The combination unit 46, the second hyper-parameter optimization unit 50, the target calculation unit 52, the first hyper-parameter NN and downstream task NN and speech enhancement NN learning unit 62, the second speech enhancement unit 24, the first hyper-parameter optimization unit 26, the mask generation unit 28, the adapted speech enhancement unit 30, and a downstream task processing unit 32 are implemented by a CPU of a computer operating according to a program (hyper-parameter optimization program).

Figure 8:
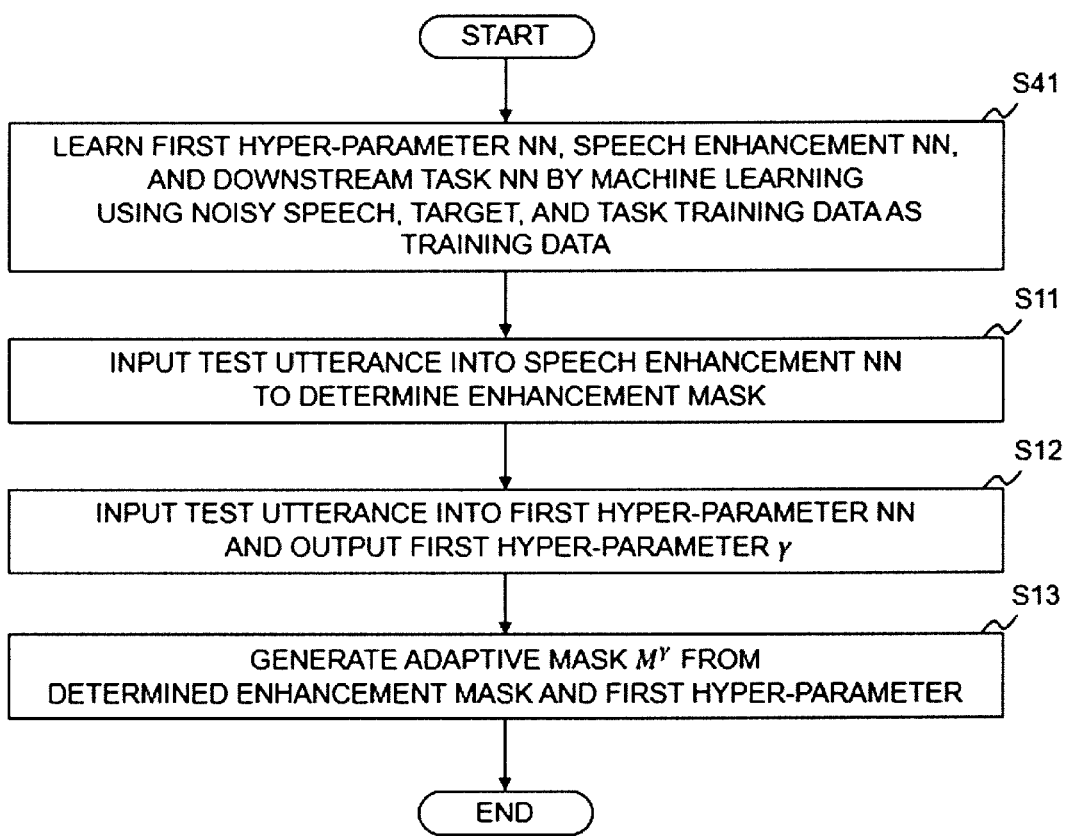

Next, an operation example of the parameter optimization system according to the present exemplary embodiment will be described. FIG. 8 depicts a flowchart illustrating the process of the fourth exemplary embodiment of the parameter optimization system 400 according to the disclosure.

The first hyper-parameter NN and downstream task NN and speech enhancement NN learning unit 62 learns the first hyper-parameter NN, the speech enhancement NN, and the downstream task NN by a machine learning using the noisy speech, the target, and the task training data as training data (step S41). Thereafter, the processes of steps S11 to S13 in FIG. 2 are performed using the learned first hyper-parameter NN, the speech enhancement NN, and the downstream task NN.

As described above, in the present exemplary embodiment, the first hyper-parameter NN and downstream task NN and speech enhancement NN learning unit 62 learns the first hyper-parameter NN, the downstream task NN, and the speech enhancement NN. Thus, in addition to the effect of the first embodiment, the speech enhancement NN and the downstream task NN can be optimized simultaneously.

Figure 9:
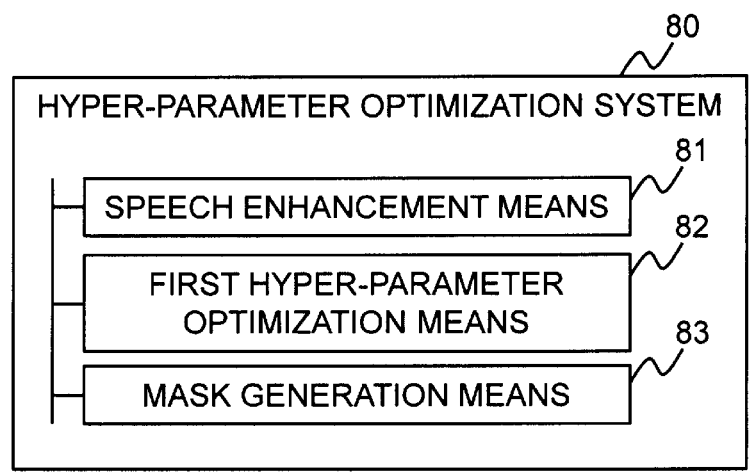

Next, an outline of the disclosure will be described. FIG. 9 depicts a block diagram illustrating an outline of the hyper-parameter optimization system according to the disclosure. The hyper-parameter optimization system 80 (for example, hyper-parameter optimization system 100 to 400) including: a speech enhancement means 81 (e.g., the second speech enhancement unit 24) which determines an enhancement mask generated based on a mask (e.g., M) for speech enhancement, when a test utterance is input as speech data; a first hyper-parameter optimization means 82 (e.g., the first hyper-parameter optimization unit 26) which determines, when the test utterance is input, a first hyper-parameter (e.g., [gamma]) which is a hyper-parameter representing the degree to which the signal representing the test utterance is kept using the mask, and the first hyper-parameter which is set to take into account a downstream task that is processed using an enhanced test utterance; and a mask generation means 83 (e.g., the mask generation unit 28) which generates an adaptive mask (e.g., $M^{[gamma]}$) from the determined enhancement mask and the first hyper-parameter that enhances the test utterance for the downstream task.

The mask generation means 83 generates the adaptive mask in which the first hyper-parameter is a power of the mask.

With such a configuration, it is possible to determine the optimum hyper-parameters of the mask that enhances speech according to the nature of the downstream task.

The first hyper-parameter optimization means may have a trained first hyper-parameter neural network that has been machine learning using training data including downstream task label indicating a processing result of the downstream task, training speech with noise, the enhancement mask, and parameters of a neural network of the downstream task, so as to output the first hyper-parameter when speech data with noise is input.

The speech enhancement means 81 may has a trained speech enhancement neural network that has been machine learning so as to output the enhancement mask from speech data when the speech data with noise is input.

The hyper-parameter optimization system 80 may include a first hyper-parameter neural network training means (e.g., the first hyper-parameter NN training unit 20) which trains a first hyper-parameter neural network, which includes an input layer that accepts speech data and an output layer that outputs the first hyper-parameter, by a machine learning using training data including training speech, the enhancement mask, and parameters of a neural network of the downstream task.

The hyper-parameter optimization system 80 may include a first hyper-parameter neural network and downstream task neural network training means (e.g., first hyper-parameter NN and downstream task NN training unit 36) which trains a first hyper-parameter neural network and a downstream task neural network, the first hyper-parameter neural network which includes an input layer that accepts speech data and an output layer that outputs the first hyper-parameter, the downstream task neural network which includes an input layer that accepts speech data and an output layer that outputs results of the downstream task, by a machine learning using training data including training speech, the enhancement mask, and task training data associated with speech data and a correct label for downstream task.

The hyper-parameter optimization system 80 may include a first hyper-parameter neural network and speech enhancement neural network training means (e.g., first hyper-parameter NN and speech enhancement NN learning unit 56) which trains a first hyper-parameter neural network and a speech enhancement neural network, the first hyper-parameter neural network which includes an input layer that accepts speech data and an output layer that outputs the first hyper-parameter, the speech enhancement neural network which includes an input layer that accepts speech data and an output layer that outputs a target indicating the degree of speech enhancement calculated based on the mask, by a machine learning using training data including speech data with noise, the target, task training data associated with speech data and a correct label for downstream task, and parameters of a neural network of the downstream task.

The hyper-parameter optimization system 80 may include a three types of neural network learning means (e.g., first hyper-parameter NN and downstream task NN and speech enhancement NN learning unit 62) which trains a first hyper-parameter neural network, a downstream task neural network, and a speech enhancement neural network, the first hyper-parameter neural network which includes an input layer that accepts speech data and an output layer that outputs the first hyper-parameter, the speech enhancement neural network which includes an input layer that accepts speech data and an output layer that outputs a target indicating the degree of speech enhancement calculated based on the mask, and the downstream task neural network which includes an input layer that accepts speech data and an output layer that outputs results of the downstream task, by a machine learning using training data including speech data with noise, the target, and task training data associated with speech data and correct labels for downstream task.

The hyper-parameter optimization system 80 may include: a second hyper-parameter optimization means (e.g., second hyper-parameter optimization unit 50) that optimizes a second hyper-parameter that is used for training of the speech enhancement neural network; and a target calculating means (e.g., target calculation unit 52) that receives the second hyper-parameter from the second hyper-parameter optimization means and calculates a mask (e.g., $M^{[alpha]}$) in which the second hyper-parameter is a power of the mask as the target.

The second hyper-parameter may be optimized based on at least one of gradient methods.

The mask may be a matrix consisting of real or complex continuous values taking at least one form of Ideal Ratio Mask, Complex Ideal Ratio Mask, Spectral Magnitude Mask, and Phase-Sensitive Mask.

The hyper-parameter optimization system 80 may include: an adapted speech enhancement means (e.g., adapted speech enhancement unit 30) which applies the adaptive mask to the test utterance to generate adaptive speech data which is enhanced speech data; and a downstream task processing means (e.g., downstream task processing unit 32) which inputs the adaptive speech data and outputs a processing result.

Figure 10:
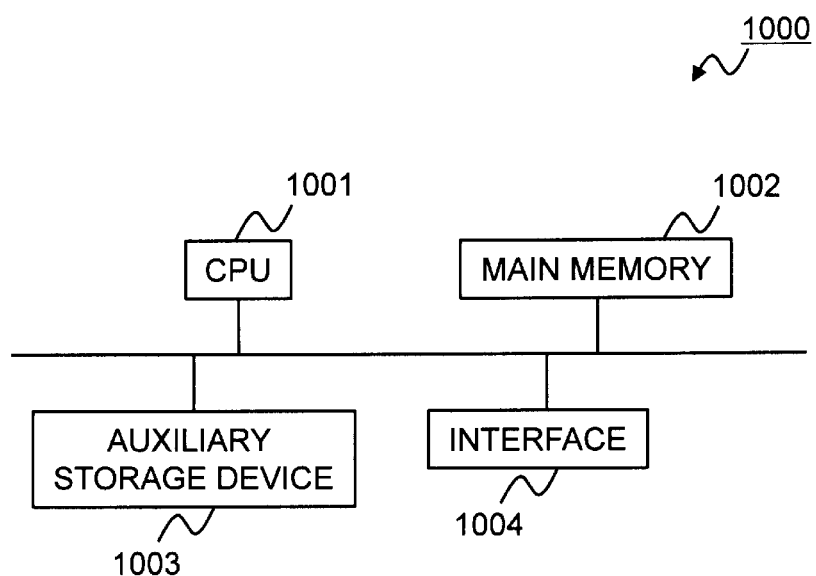

FIG. 10 depicts a schematic block diagram illustrating a configuration of a computer according to at least one of the exemplary embodiments. A computer 1000 includes a CPU 1001, a main storage device 1002, an auxiliary storage device 1003, and an interface 1004.

Each of the above-described hyper-parameter parameter optimization system is mounted on the computer 1000. The operation of the respective processing units described above is stored in the auxiliary storage device 1003 in the form of a program (a hyper-parameter parameter optimization program). The CPU 1001 reads the program from the auxiliary storage device 1003, deploys the program in the main storage device 1002, and executes the above processing according to the program.

Note that at least in one of the exemplary embodiments, the auxiliary storage device 1003 is an exemplary non-transitory physical medium. Other examples of non-transitory physical medium include a magnetic disc, a magneto-optical disk, a CD-ROM, a DVD-ROM, and a semiconductor memory that are connected via the interface 1004. In the case where the program is distributed to the computer 1000 by a communication line, the computer 1000 distributed with the program may deploy the program in the main storage device 1002 to execute the processing described above.

Incidentally, the program may implement a part of the functions described above. The program may implement the aforementioned functions in combination with another program stored in the auxiliary storage device 1003 in advance, that is, the program may be a differential file (differential program).

While the invention has been particularly shown and described with reference to example embodiments thereof, the invention is not limited to these embodiments. It will be understood by those of ordinary skill in the art that various changes in form and details may be made therein without departing from the spirit and scope of the disclosure as defined by the claims.

The whole or part of the example embodiments disclosed above can be described as, but not limited to, the following supplementary notes.

(Supplementary note 1) A hyper-parameter optimization system comprising:
    a speech enhancement means which determines an enhancement mask generated based on a mask for speech enhancement, when a test utterance is input as speech data;
    a first hyper-parameter optimization means which determines, when the test utterance is input, a first hyper-parameter which is a hyper-parameter representing the degree to which the signal representing the test utterance is kept using the mask, and the first hyper-parameter which is set to take into account a downstream task that is processed using an enhanced test utterance; and
    a mask generation means which generates an adaptive mask from the determined enhancement mask and the first hyper-parameter that enhances the test utterance for the downstream task,
    wherein the mask generation means generates the adaptive mask in which the first hyper-parameter is a power of the mask.

(Supplementary note 2) The hyper-parameter optimization system according to Supplementary note 1,
    wherein the first hyper-parameter optimization means has a trained first hyper-parameter neural network that has been machine learning using training data including downstream task label indicating a processing result of the downstream task, training speech with noise, the enhancement mask, and parameters of a neural network of the downstream task, so as to output the first hyper-parameter when speech data with noise is input.

(Supplementary note 3) The hyper-parameter optimization system according to Supplementary note 1 or 2,
    wherein the speech enhancement means has a trained speech enhancement neural network that has been machine learning so as to output the enhancement mask from speech data when the speech data with noise is input.

(Supplementary note 4) The hyper-parameter optimization system according to any one of Supplementary notes 1 to 3, further comprising
a first hyper-parameter neural network training means which trains a first hyper-parameter neural network, which includes an input layer that accepts speech data and an output layer that outputs the first hyper-parameter, by a machine learning using training data including training speech, the enhancement mask, and parameters of a neural network of the downstream task.

(Supplementary note 5) The hyper-parameter optimization system according to any one of Supplementary notes 1 to 3, further comprising
a first hyper-parameter neural network and downstream task neural network training means which trains a first hyper-parameter neural network and a downstream task neural network, the first hyper-parameter neural network which includes an input layer that accepts speech data and an output layer that outputs the first hyper-parameter, the downstream task neural network which includes an input layer that accepts speech data and an output layer that outputs results of the downstream task, by a machine learning using training data including training speech, the enhancement mask, and task training data associated with speech data and a correct label for downstream task.

(Supplementary note 6) The hyper-parameter optimization system according to any one of Supplementary notes 1 to 3, further comprising
a first hyper-parameter neural network and speech enhancement neural network training means which trains a first hyper-parameter neural network and a speech enhancement neural network, the first hyper-parameter neural network which includes an input layer that accepts speech data and an output layer that outputs the first hyper-parameter, the speech enhancement neural network which includes an input layer that accepts speech data and an output layer that outputs a target indicating the degree of speech enhancement calculated based on the mask, by a machine learning using training data including speech data with noise, the target, task training data associated with speech data and a correct label for downstream task, and parameters of a neural network of the downstream task.

(Supplementary note 7) The hyper-parameter optimization system according to any one of Supplementary notes 1 to 3, further comprising
a three types of neural network learning means which trains a first hyper-parameter neural network, a downstream task neural network, and a speech enhancement neural network, the first hyper-parameter neural network which includes an input layer that accepts speech data and an output layer that outputs the first hyper-parameter, the speech enhancement neural network which includes an input layer that accepts speech data and an output layer that outputs a target indicating the degree of speech enhancement calculated based on the mask, and the downstream task neural network which includes an input layer that accepts speech data and an output layer that outputs results of the downstream task, by a machine learning using training data including speech data with noise, the target, and task training data associated with speech data and correct labels for downstream task.

(Supplementary note 8) The hyper-parameter optimization system according to Supplementary note 6 or 7, further comprising:
a second hyper-parameter optimization means that optimizes a second hyper-parameter that is used for training of the speech enhancement neural network; and
a target calculating means that receives the second hyper-parameter from the second hyper-parameter optimization means and calculates a mask in which the second hyper-parameter is a power of the mask as the target.

(Supplementary note 9) The hyper-parameter optimization system according to Supplementary note 8, wherein the second hyper-parameter is optimized based on at least one of gradient methods.

(Supplementary note 10) The hyper-parameter optimization system according to any one of claims 1 to 9, wherein, the mask is a matrix consisting of real or complex continuous values taking at least one form of Ideal Ratio Mask, Complex Ideal Ratio Mask, Spectral Magnitude Mask, and Phase-Sensitive Mask.

(Supplementary note 11) The hyper-parameter optimization system according to any one of Supplementary notes 1 to 10, further comprising:
an adapted speech enhancement means which applies the adaptive mask to the test utterance to generate adaptive speech data which is enhanced speech data; and
a downstream task processing means which inputs the adaptive speech data and outputs a processing result.

(Supplementary note 12) A hyper-parameter optimization method comprising:
determining an enhancement mask generated based on a mask for speech enhancement, when a test utterance is input as speech data;
determining, when the test utterance is input, a first hyper-parameter which is a hyper-parameter representing the degree to which the signal representing the test utterance is kept using the mask, and the first hyper-parameter which is set to take into account a downstream task that is processed using an enhanced test utterance; and
generating an adaptive mask from the determined enhancement mask and the first hyper-parameter that enhances the test utterance for the downstream task, wherein the adaptive mask in which the first hyper-parameter is a power of the mask is generated.

(Supplementary note 13) A non-transitory computer readable information recording medium storing a hyper-parameter optimization program, when executed by a processor, that performs a method for:
determining an enhancement mask generated based on a mask for speech enhancement, when a test utterance is input as speech data;
determining, when the test utterance is input, a first hyper-parameter which is a hyper-parameter representing the degree to which the signal representing the test utterance is kept using the mask, and the first hyper-parameter which is set to take into account a downstream task that is processed using an enhanced test utterance; and
generating an adaptive mask from the determined enhancement mask and the first hyper-parameter that enhances the test utterance for the downstream task, wherein the adaptive mask in which the first hyper-parameter is a power of the mask is generated.

(Supplementary note 14) A hyper-parameter optimization program for causing a computer to execute:
- a speech enhancement process of determining an enhancement mask generated based on a mask for speech enhancement, when a test utterance is input as speech data;
- a first hyper-parameter optimization process of determining, when the test utterance is input, a first hyper-parameter which is a hyper-parameter representing the degree to which the signal representing the test utterance is kept using the mask, and the first hyper-parameter which is set to take into account a downstream task that is processed using an enhanced test utterance; and
- a mask generation process of generating an adaptive mask from the determined enhancement mask and the first hyper-parameter that enhances the test utterance for the downstream task, wherein the adaptive mask in which the first hyper-parameter is a power of the mask is generated.

REFERENCE SIGNS LIST 12 training speech input unit
14 speech enhancement neural network parameter storage unit
16 first speech enhancement unit
18 downstream task neural network parameter storage unit
20 first hyper-parameter neural network training unit
22 first hyper-parameter NN storage unit
24 second speech enhancement unit
26 first hyper-parameter optimization unit
28 mask generation unit
30 adaptive speech enhancement unit
32 downstream task processing unit
34 downstream task label storage unit
36 first hyper-parameter NN and downstream task NN training unit
42 noise storage unit
44 clean speech storage unit
46 combination unit
48 noisy speech storage unit
50 second hyper-parameter optimization unit
52 target calculation unit
54 target storage unit
56 first hyper-parameter NN and speech enhancement NN learning unit
62 speech enhancement NN and first hyper-parameter NN and downstream task NN learning unit

What is claimed is:

1. A hyper-parameter optimization system comprising:
a memory storing instructions; and
one or more processors configured to execute the instructions to:
determine an enhancement mask generated based on a mask for speech enhancement, in a case where a test utterance is input as speech data;
determine, in the case where the test utterance is input, a first hyper-parameter which is a hyper-parameter representing a degree to which a signal representing the test utterance is kept using the mask, and the first hyper-parameter which is set to take into account a downstream task that is processed using an enhanced test utterance;
generate an adaptive mask from the determined enhancement mask and the first hyper-parameter that enhances the test utterance for the downstream task, and
in which the first hyper-parameter is a power of the mask; and
train a first hyper-parameter neural network, a downstream task neural network, and a speech enhancement neural network, the first hyper-parameter neural network which includes an input layer that accepts the speech data and an output layer that outputs the first hyper-parameter, the speech enhancement neural network which includes an input layer that accepts the speech data and an output layer that outputs a target indicating a degree of the speech enhancement calculated based on the mask, and the downstream task neural network which includes an input layer that accepts the speech data and an output layer that outputs results of the downstream task, by a machine learning using training data including the speech data with noise, the target, and task training data associated with the speech data and correct labels for the downstream task.

2. The hyper-parameter optimization system according to claim 1,
wherein the trained first hyper-parameter neural network that has been trained using the training data including a downstream task label indicating a processing result of the downstream task, training speech with the noise, the enhancement mask, and parameters of a neural network of the downstream task, so as to output the first hyper-parameter in a case where the speech data with the noise is input.

3. The hyper-parameter optimization system according to claim 1,
wherein the trained speech enhancement neural network that has been trained so as to output the enhancement mask from the speech data in a case where the speech data with the noise is input.

4. The hyper-parameter optimization system according to claim 1, wherein the processor further executes instructions to:
optimize a second hyper-parameter that is used for training of the speech enhancement neural network; and
receive the second hyper-parameter and calculate the mask in which the second hyper-parameter is the power of the mask as the target.

5. The hyper-parameter optimization system according to claim 4,
wherein the second hyper-parameter is optimized based on at least one of gradient methods.

6. The hyper-parameter optimization system according to claim 1,
wherein the mask is a matrix consisting of real or complex continuous values taking at least one form of Ideal Ratio Mask, Complex Ideal Ratio Mask, Spectral Magnitude Mask, and Phase-Sensitive Mask.

7. The hyper-parameter optimization system according to claim 1, wherein the processor further executes instructions to:
apply the adaptive mask to the test utterance to generate adaptive speech data which is enhanced speech data; and
input the adaptive speech data and output a processing result.

8. A hyper-parameter optimization method performed by a computer and comprising:
- determining an enhancement mask generated based on a mask for speech enhancement, in a case where a test utterance is input as speech data;
- determining, in the case where the test utterance is input, a first hyper-parameter which is a hyper-parameter representing a degree to which a signal representing the test utterance is kept using the mask, and the first hyper-parameter which is set to take into account a downstream task that is processed using an enhanced test utterance;
- generating an adaptive mask from the determined enhancement mask and the first hyper-parameter that enhances the test utterance for the downstream task, and
- in which the first hyper-parameter is a power of the mask; and
- training a first hyper-parameter neural network, a downstream task neural network, and a speech enhancement neural network, the first hyper-parameter neural network which includes an input layer that accepts the speech data and an output layer that outputs the first hyper-parameter, the speech enhancement neural network which includes an input layer that accepts the speech data and an output layer that outputs a target indicating a degree of the speech enhancement calculated based on the mask, and the downstream task neural network which includes an input layer that accepts the speech data and an output layer that outputs results of the downstream task, by a machine learning using training data including the speech data with noise, the target, and task training data associated with the speech data and correct labels for the downstream task.

9. A non-transitory computer readable information recording medium storing a hyper-parameter optimization program executable by a processor to perform a method comprising;
- determining an enhancement mask generated based on a mask for speech enhancement, in a case where a test utterance is input as speech data;
- determining, in the case where the test utterance is input, a first hyper-parameter which is a hyper-parameter representing a degree to which a signal representing the test utterance is kept using the mask, and the first hyper-parameter which is set to take into account a downstream task that is processed using an enhanced test utterance;
- generating an adaptive mask from the determined enhancement mask and the first hyper-parameter that enhances the test utterance for the downstream task, and
- in which the first hyper-parameter is a power of the mask; and
- training a first hyper-parameter neural network, a downstream task neural network, and a speech enhancement neural network, the first hyper-parameter neural network which includes an input layer that accepts the speech data and an output layer that outputs the first hyper-parameter, the speech enhancement neural network which includes an input layer that accepts the speech data and an output layer that outputs a target indicating a degree of the speech enhancement calculated based on the mask, and the downstream task neural network which includes an input layer that accepts the speech data and an output layer that outputs results of the downstream task, by a machine learning using training data including the speech data with noise, the target, and task training data associated with the speech data and correct labels for the downstream task.

* * * * *